(12) United States Patent
Jurrens (10) Patent No.: US 6,905,126 B1
(45) Date of Patent: Jun. 14, 2005

(54) AIR-BAG SUSPENSION SYSTEM (76) Inventor: Jesse A. Jurrens, 1947 Rand Rd., Rapid City, SD (US) 57702

( * ) Notice: Subject to any disclaimer, the term of this patent is extended or adjusted under 35 U.S.C. 154(b) by 0 days.

(21) Appl. No.: 10/187,528

(22) Filed: Jul. 1, 2002

Related U.S. Application Data (63) Continuation-in-part of application No. 09/753,591, filed on Jan. 3, 2001, now abandoned.

(51) Int. Cl.$^7$ .............................................. B60G 17/01
(52) U.S. Cl. ................ 280/5.514; 280/6.157; 280/6.158; 280/284; 280/214.158
(58) Field of Search ................ 280/283, 284, 280/124.1, 124.157, 124.158, 6.159, 5.514, 6.157, 6.158; 180/215, 218, 219, 227, 41; 267/64.25, 64.26, 64.27, 64.28, 118, 122, 123; 152/416

(56) References Cited

U.S. PATENT DOCUMENTS

| | | | |
|---|---|---|---|
| 3,459,441 A * | 8/1969 | Hornsby | 280/276 |
| 3,574,352 A * | 4/1971 | Elliott | 280/6.158 |
| 3,592,485 A * | 7/1971 | Buhl | 280/6.159 |
| 3,603,611 A * | 9/1971 | Wenham | 267/64.16 |
| 3,618,972 A * | 11/1971 | Buhl | 267/187 |
| 3,691,336 A * | 9/1972 | Higginbotham | 200/288 |
| 3,977,697 A * | 8/1976 | MacPike et al. | 280/284 |
| 4,022,448 A * | 5/1977 | Reeder | 267/226 |
| RE30,462 E * | 12/1980 | Pohl | 414/545 |
| 4,354,693 A * | 10/1982 | Maeda et al. | 267/64.21 |
| 4,422,661 A * | 12/1983 | Kawamura | 200/276 |
| 4,513,837 A * | 4/1985 | Archer | 180/209 |
| 4,563,038 A * | 1/1986 | Hirose | 297/243 |
| 4,568,101 A * | 2/1986 | Bleustein et al. | 180/227 |
| 4,709,934 A * | 12/1987 | Suzuki et al. | 280/6.157 |
| 4,815,758 A * | 3/1989 | Yoshida | 280/6.159 |
| 5,069,302 A * | 12/1991 | Kageyama | 180/197 |
| 5,348,112 A * | 9/1994 | Vaillancourt | 180/227 |
| 5,711,390 A * | 1/1998 | Hikichi et al. | 180/219 |
| 6,003,628 A * | 12/1999 | Jurrens et al. | 180/227 |
| 6,068,276 A * | 5/2000 | Kallstrom | 280/124.157 |
| 6,193,005 B1 * | 2/2001 | Jurrens | 180/227 |
| 6,296,092 B1 * | 10/2001 | Marking et al. | 188/315 |
| 6,357,546 B1 * | 3/2002 | Crosby, Jr. | 180/227 |
| 6,520,524 B1 * | 2/2003 | Costa | 280/276 |
| 6,641,154 B1 * | 11/2003 | Vey et al. | 280/124.157 |
| 6,668,960 B1 * | 12/2003 | Parker | 180/227 |
| 2003/0132074 A1 * | 7/2003 | Robbins | 188/322.15 |

* cited by examiner

Primary Examiner—Lesley D. Morris
Assistant Examiner—Daniel Yeagley

(57) ABSTRACT

An air-bag suspension system for a motorcycle having a motorcycle main frame, fender struts extending outwardly from the main frame, and a swing arm pivotally mounted to the main frame about a pivot axis. The air-bag suspension system includes shock absorber assemblies each having an air-bag. The air in the air-bags is generated by an on-board compressor and released through a solenoid valve. The air-bag suspension system replaces the standard coil spring hydraulic suspension commonly found on motorcycles and provides a greater range of adjustment, remotely controlled, while the motorcycle is in use. The air-bag suspension system accommodates heavier loads than the stock suspension systems when the air-bags are fully inflated; and when deflated completely, provide an aesthetically pleasing stance. The range of wheel travel provided allows the rider to adjust the suspension to provide the smoothest ride coupled with an increased load capacity or adverse road conditions.

22 Claims, 9 Drawing Sheets

AIR-BAG SUSPENSION SYSTEM

CROSS REFERENCES TO CO-PENDING APPLICATIONS

This application is a continuation-in-part (CIP) of Ser. No. 09/753,591 entitled "Air-Bag Suspension System" filed on Jan. 3, 2001, now abandoned both by the same inventor, pending.

BACKGROUND OF THE INVENTION

1. Field of the Invention

The present invention is for an air-bag suspension system for a motorcycle or other vehicle which utilizes an on-board compressor to increase the pressure in the air-bags and a controlled release valve for decreasing the pressure in the air-bags. The air-bag suspension system replaces the standard coil spring hydraulic shock system currently and previously used on most motorcycle rear suspension systems. The air-bag suspension system creates a greater range of wheel travel which allows the user to raise or lower the rear end of the motorcycle remotely and while traveling to accommodate for motorcycle load, rear fender ground clearance, road conditions and desired appearance.

The present invention adapts the teachings of the previously filed patent applications, but applies them to motorcycles other than the Harley-Davidson® SOFTAIL® model. The reconfiguration of the SOFTAIL® air-bag suspension system permits use of an air-bag suspension system for use on Harley-Davidson® "FL" models and other motorcycles which use coil spring hydraulic shock absorbers. It is to be understood that the air-bag suspension system is not limited to motorcycles, and may be used on ATVs, automobiles, or other vehicles equipped with coil spring hydraulic suspension systems.

2. Description of the Prior Art

Prior art in the field of rear motorcycle suspension system often uses a coil spring hydraulic system which is mounted to the rear fender strut of the main frame and the swing arm of a motorcycle. The coil spring hydraulic suspension utilizes an air-assist suspension system which only allows minimal adjustment (approximately 15–35 psi), which provides minimal wheel travel which causes bottoming out, and which requires frequent replacement due to seal and overall shock failure. The coil spring hydraulic shock absorbers also must be manually adjusted with a hand pump when the motorcycle is not in use. The present invention overcomes the shortcomings of the prior art by providing a durable air-bag suspension system which can be remotely engaged causing the rear end of the motorcycle to rise and lower while the motorcycle is being ridden. The air-bag suspension system also provides more wheel travel (3.5 inches) and adjustment capacity (0 psi to 150 psi) than the standard coil spring hydraulic suspension system (0 psi to 35 psi). The air-bag suspension system allows the user to carry significantly more weight than 300–400 pounds, whereas the standard coil spring hydraulic system will bottom out when the motorcycle is loaded with 300–400 pounds. The air-bag suspension system is designed for a fast and easy aftermarket exchange and creates a smoother, more comfortable ride and an increased load capacity than that of the stock coil spring hydraulic suspension system.

SUMMARY OF THE INVENTION

An air-bag suspension system for a motorcycle having a main frame, a pair of fender struts mounted to the main frame in a parallel fashion, and a swing arm pivotally mounted to the motorcycle main frame about a pivot axis. The air-bag suspension system includes an on-board compressor, a solenoid valve, at least one or two shock absorber assemblies each having an internal air-bag, and a plurality of air hoses and Y-connectors. The swing arm includes a pair of arms which include mounting brackets to accommodate the lower ends of the shock absorber assemblies. The air-bag suspension system allows the rider to remotely raise and lower the rear end of the motorcycle while in use by increasing or decreasing the air in the air-bags and provides a broad range of adjustment to accommodate heavy loads, bottoming-out, road hop and desirable aesthetic characteristics. The air is generated by the on-board compressor and released by the solenoid valve. There is also provided an optional pressure gauge which allows the rider to monitor the amount of air in the air-bags at all times. When properly adjusted, the air-bag suspension system provides a smoother ride with greater wheel travel than that provided by stock suspension systems.

One significant aspect and feature of the present invention is an on-board compressor and solenoid valve which control the amount of air in the air-bag suspension system.

Another significant aspect and feature of the present invention is increased wheel travel which allows greater adjustment range to create the smoothest ride.

Still another significant aspect and feature of the present invention is elastomeric air-bags incorporated into the shock absorber assemblies.

Yet another significant aspect and feature of the present invention is an optional pressure gauge which allows constant monitoring of the amount of air in the air-bag suspension system.

A further significant aspect and feature of the present invention is greater load capacity than stock suspension.

A still further significant aspect and feature of the present invention is elimination of road hop when properly adjusted.

Yet another significant aspect and feature of the present invention is the ability to remotely adjust the stiffness\softness of the suspension while the motorcycle is in use without the need for special tools.

Having thus described an embodiment of the present invention and mentioned significant aspects and features, it is the principal object of the present invention to provide an adjustable air-bag suspension system to create a smoother ride.

One object of the present invention is to provide an air-bag suspension system which allows for more wheel travel and greater range of adjustment.

Another object of the present invention is to provide an on-board compressor and solenoid valve to control the amount of air in the air-bag suspension system.

Yet another object of the present invention is to provide an air-bag suspension system that prevents bottoming-out when carrying a heavy load.

Still another object of the present invention is to provide an easily exchangeable air-bag suspension system to replace the standard coil spring hydraulic system.

A further object of the present invention is to provide an air-bag suspension system which allows the rider to adjust the amount of stiffness\softness of the suspension while the motorcycle is in motion.

A still further object of the present invention is to provide a means to lower the rear end of the motorcycle as near to the ground as desired for aesthetic purposes.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
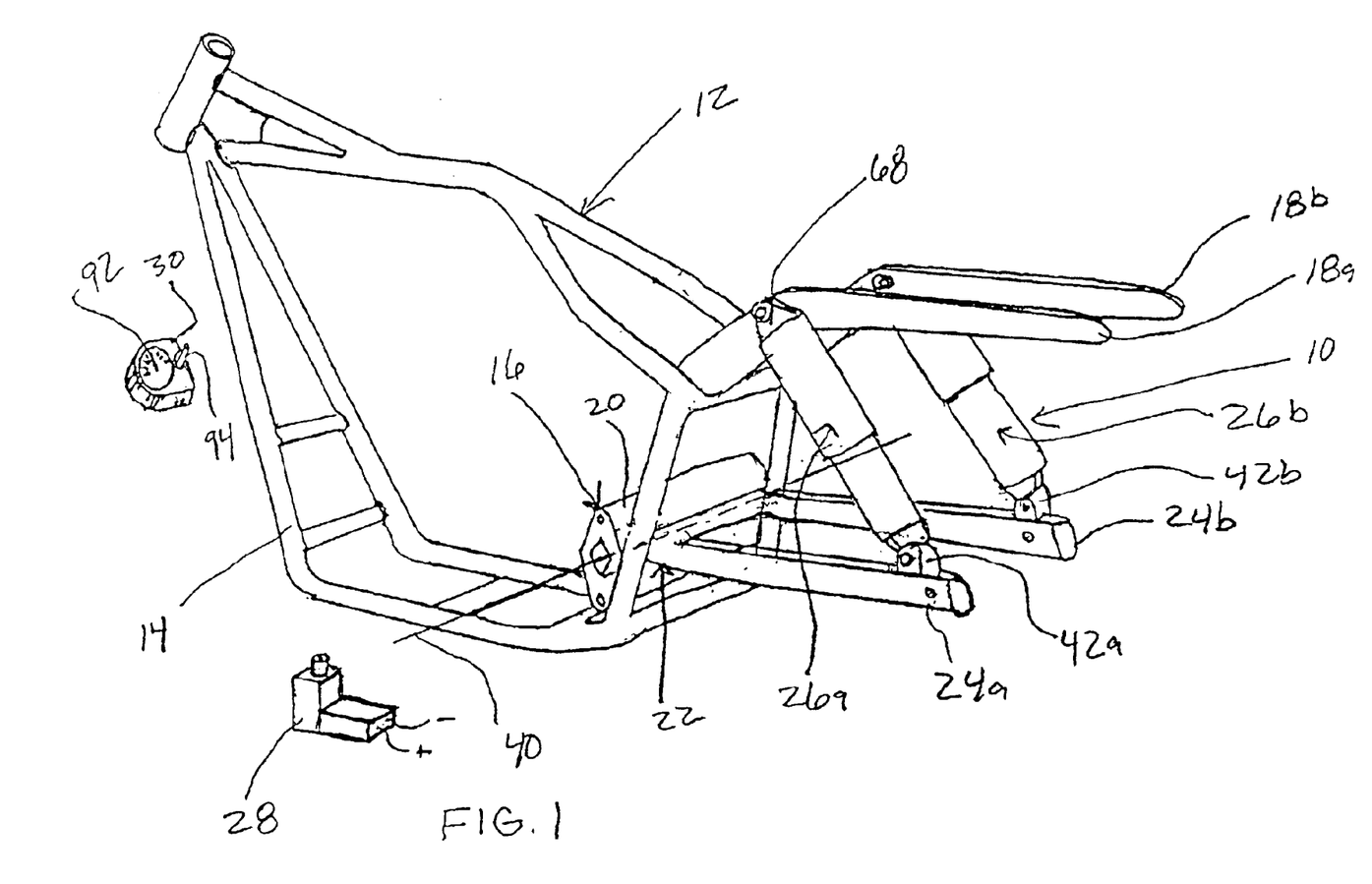
FIG. 1 illustrates an isometric view of the air-bag suspension system, the present invention, mounted to a representative motorcycle chassis.
Figure 6:
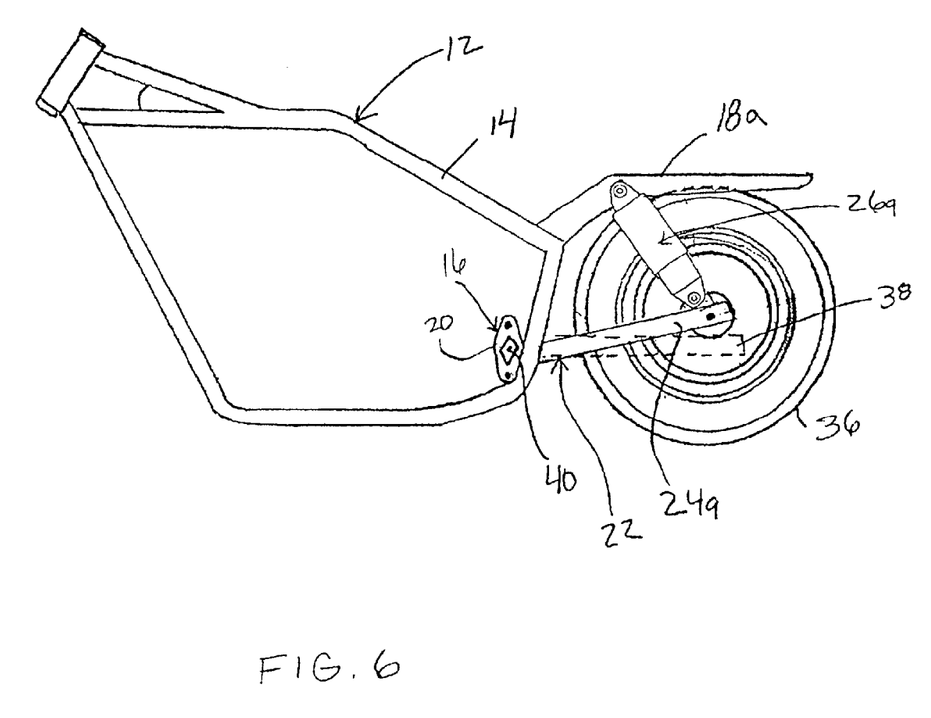
FIG. 6 illustrates a side view of a motorcycle chassis where the air-bag suspension system is completely compressed.
Figure 7:
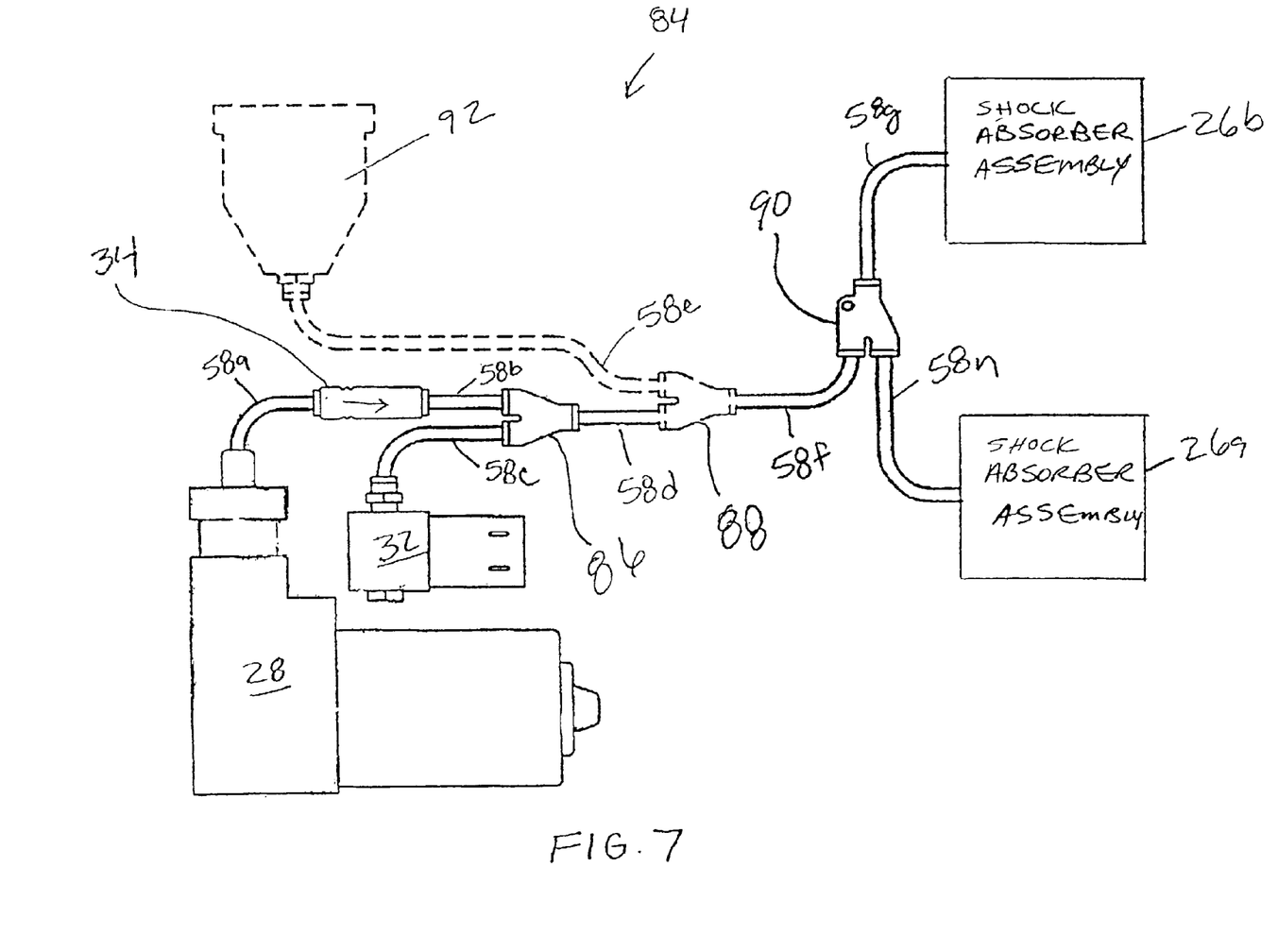
FIG. 7 is a schematic of the air source and distribution system of the air-bag suspension system.

FIG. 1 illustrates an isometric view of the air-bag suspension system 10, the present invention, mounted to a representative motorcycle chassis 12. The chassis 12 is comprised of a main frame 14, a swing arm assembly 16 which is appropriately mounted to the main frame, and a pair of fender struts 18a and 18b. The swing arm assembly 16 is comprised of swing arm pivot assembly 20 and a swing arm 22 having a pair of arms 24a and 24b. The construction and function of the swing arm assembly 16 is understood by anyone skilled in the art. The air-bag suspension system 10 is comprised of shock absorber assemblies 26a and 26b, an on-board compressor 28, a solenoid valve 32 (shown in FIGS. 7 and 8), a control panel 30 having a pressure gauge 92 and a switch 94, and a plurality air hoses 58a–58n and Y-connectors 86, 88 and 90, as illustrated in FIG. 7. The control panel 30 may be mounted on the handlebars, the gas tank, the main frame 14 or any other appropriate position where the rider can monitor the pressure gauge 92 and actuate switch 94. The control panel 30 may be separated and the switch 94 and pressure gauge 92 may be mounted in different locations. The compressor 28 and solenoid valve 32 may be mounted to the battery box, the main frame or any other appropriate position. The air hoses 58a–58n and Y-connectors 86, 88 and 90 interconnect the shock absorber assemblies 26a and 26b with the compressor 28, solenoid valve 32 and control panel 30, and are routed and appropriately secured to the motorcycle in such a fashion as to not interfere with the operation of the motorcycle. The shock absorber assemblies 26a and 26b replace the factory installed coil spring hydraulic shock absorbers, and will be described in detail with reference to FIGS. 2–4. The shock absorber assemblies 26a and 26b are mounted at their upper ends by their fender strut mounts 68 to the fender struts 18a and 18b, respectively, which are secured to the main frame 14, as illustrated. The lower ends of shock absorber assemblies 26a and 26b are mounted to mounting brackets 42a and 42b which are incorporated in the arms 24a and 24b of the swing arm 22 which is pivotally secured to the swing arm pivot assembly 20. The swing arm pivot assembly 20 is mounted to the main frame 14, allowing pivotal rotation of arms 24a and 24b of the swing arm 22 about pivot axis 40. The range of pivotal rotation will be further described and illustrated in FIGS. 5–6.

Figure 2:
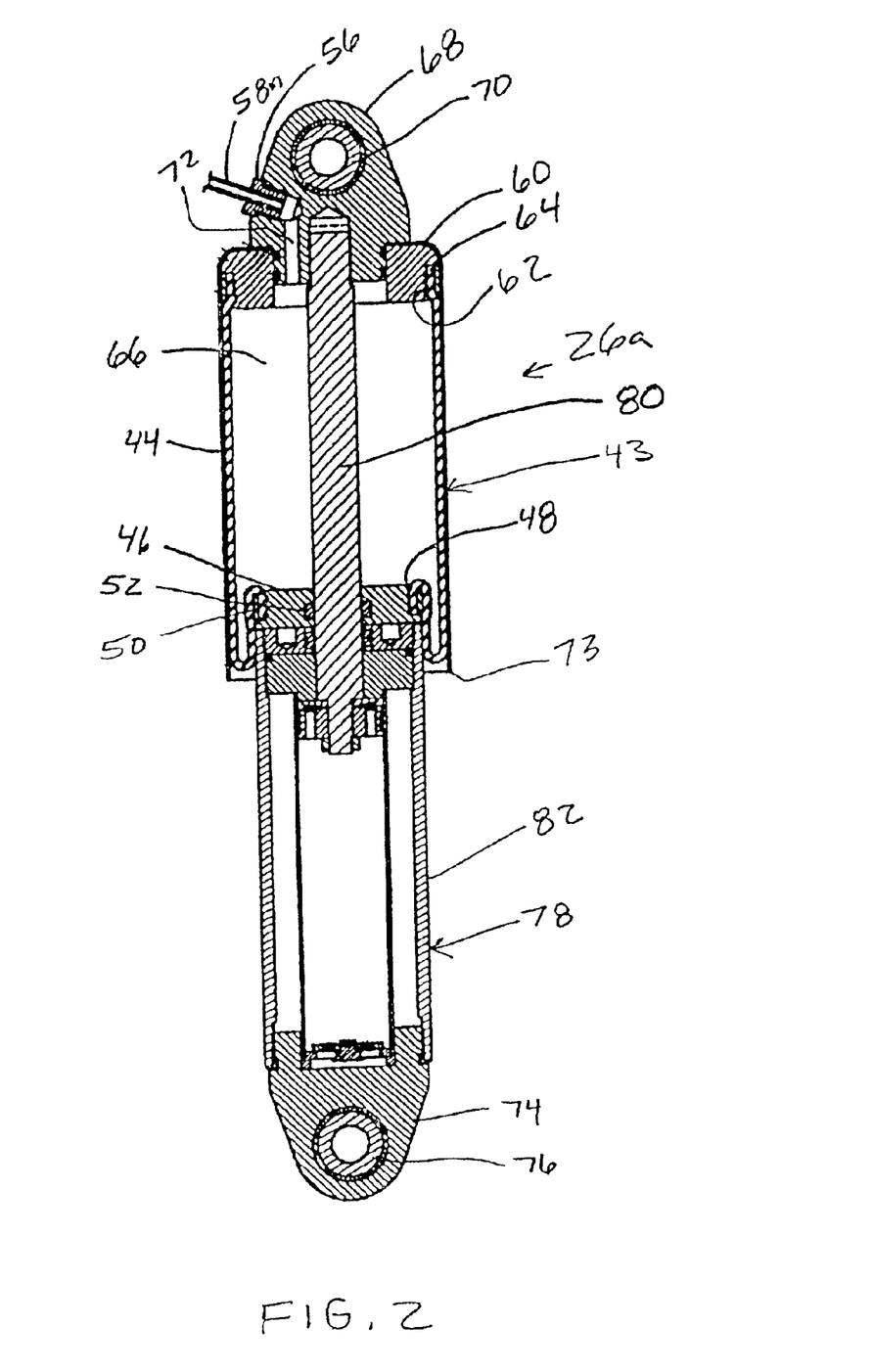
FIG. 2 illustrates a cross sectional view of a shock absorber assembly which is fully extended.

FIG. 2 illustrates a cross-sectional view of shock absorber assembly 26a which is fully extended. Now described in detail is the shock absorber assembly 26a. It is to be understood that shock absorber assembly 26b is identical in construction and function to shock absorber assembly 26a. The shock absorber assembly 26a is comprised of an air-bag assembly 43 and a hydraulic assembly 78.

The air-bag assembly 43 is comprised of an air-bag 44 formed of an elastomeric material, a piston 46 having a lower annular flange 48, a piston clamp 50, a piston seal 52, an air hose fitting 56, an air hose 58n, an air-bag cap 60 having an upper annular flange 62, a cap clamp 64, and a fender strut mount 68. The air-bag 44 is internally secured to piston 46 at lower annular flange 48 by piston clamp 50, and air-bag 44 is externally secured to air-bag cap 60 at upper annular flange 62 by cap clamp 64, creating an extendable and retractable air pocket 66 which communicates with an aperture 72 which extends through fender strut mount 68 which is internally secured to air-bag cap 60. Air hose fitting 56 is attached to aperture 72 and allows air from air hose 58n created by compressor 28 to enter air pocket 66. The fender strut mount 68 has an internally mounted sealed bearing 70 which accommodates mounting hardware and allows pivotal rotation when secured to fender strut 18a. There is also provided an optional cover 73 which protects air-bag 44 from punctures and abrasions. The air-bag suspension system 10 will function identically with or without cover 73.

The hydraulic assembly 78 has a body 82 secured to piston 46 and a push rod 80 which constitute a typical shock absorber or hydraulic dampener when combined. The body 82 of hydraulic assembly 78 has an internally mounted swing arm mount 74 with an internally mounted sealed bearing 76 at its lower end which accommodates mounting hardware and allows pivotal rotation about pivot axis 40 (FIG. 1) when secured to arm 24a of swing arm 22. The push rod 80 travels up and down and is controlled by the amount of air in air pocket 66. Piston seal 52 slidingly engages push rod 80 and prevents air inside air-bag 44 from leaking into or out of air pocket 66.

When the shock absorber assembly 26a is fully extended, the rear end of the motorcycle will be in the fully raised position. In the fully raised position, the rider is able to carry a passenger and/or heavy load without bottoming out, maximizing the shock absorber's capability, and still experience a comfortable ride.

Figure 3:
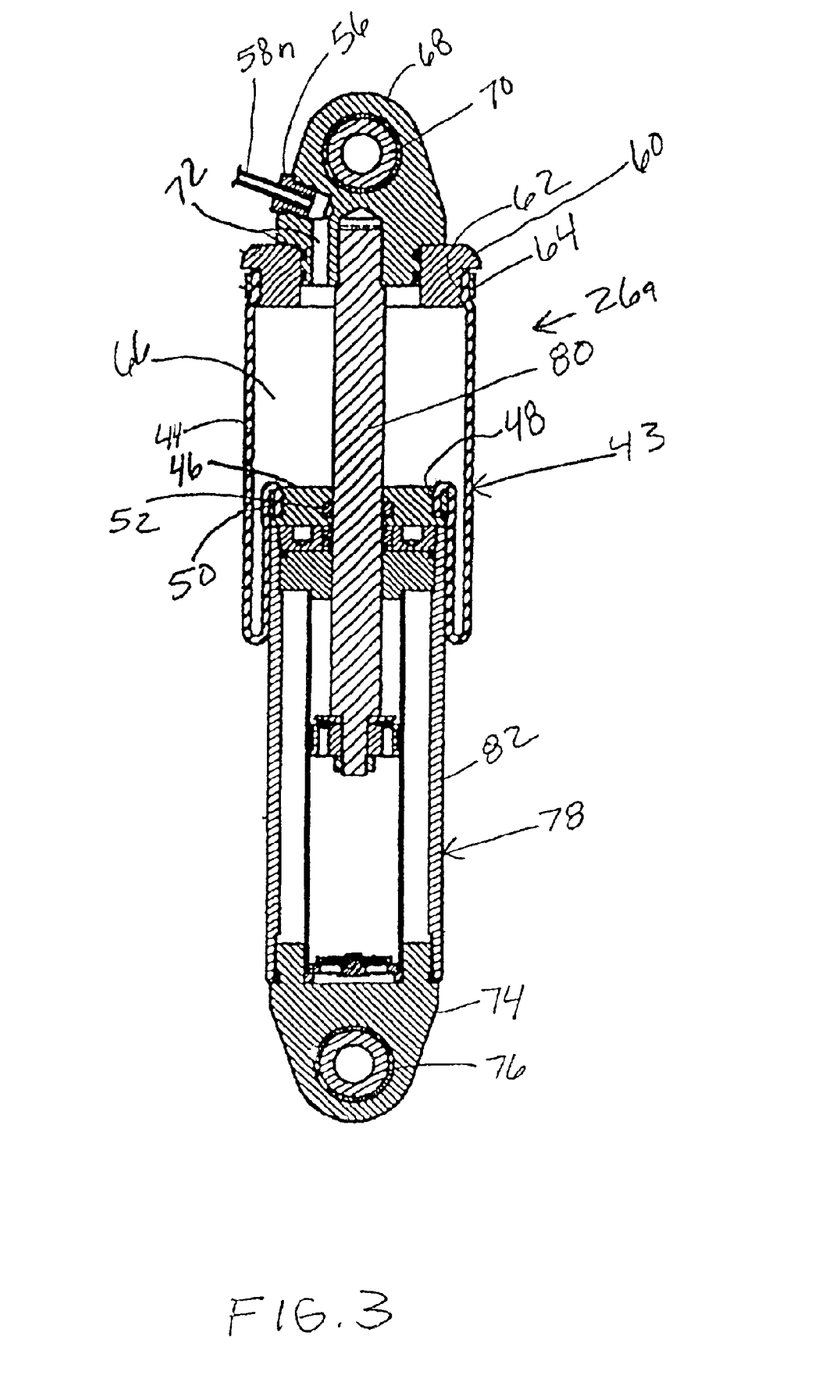
FIG. 3 illustrates a cross sectional view of a shock absorber assembly at mid-stroke.
Figure 4:
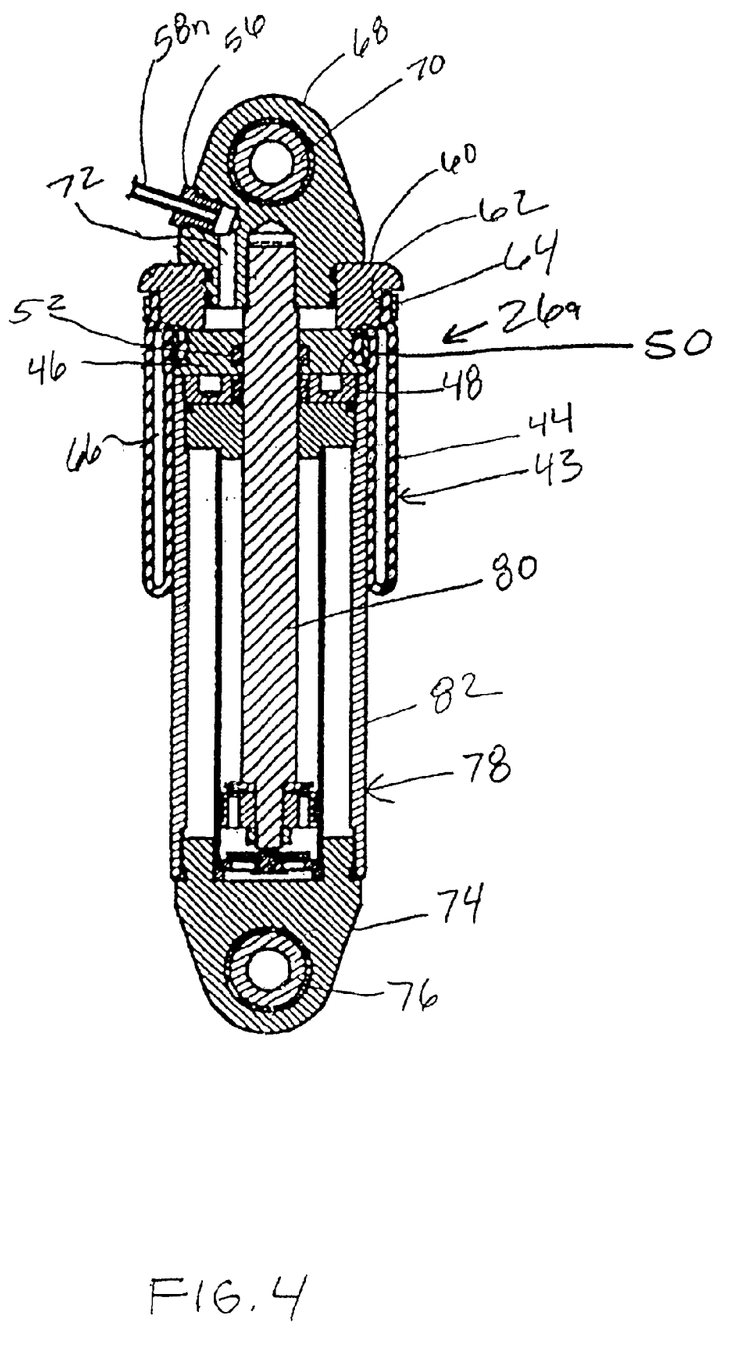
FIG. 4 illustrates a cross sectional view of a shock absorber assembly which is fully compressed.

FIG. 3 illustrates a cross-sectional view of shock absorber assembly 26a at mid-stroke, where all numerals correspond to those previously described. When shock absorber 26a is at mid-stroke, the rear suspension is partially extended and the motorcycle rear end will be halfway between the fully raised position (FIGS. 2 and 5) and the fully lowered position (FIGS. 4 and 6). In order to reach the mid-stroke position, an onboard solenoid valve 32 (illustrated in FIGS.

7–8) releases air from air bag 44 through air hose 58n and air hose fitting 56 and the air exits the air-bag suspension system 10 through solenoid valve 32. When air is released from air-bag 44, air-bag 44 deflates and piston 46 travels toward air-bag cap 60, compressing shock absorber assembly 26a. In this halfway position, the rider will experience a more cushioned ride than that of the fully extended or fully lowered positions. Cover 73 is not illustrated, and it is to be understood that cover 73 is optional.

FIG. 4 illustrates a cross-sectional view of shock absorber assembly 26a which is fully compressed, where all numerals correspond to those elements previously described. When shock absorber assembly 26a is fully compressed, the rear suspension is compressed and the motorcycle rear end will be in the fully lowered position.

Figure 5:
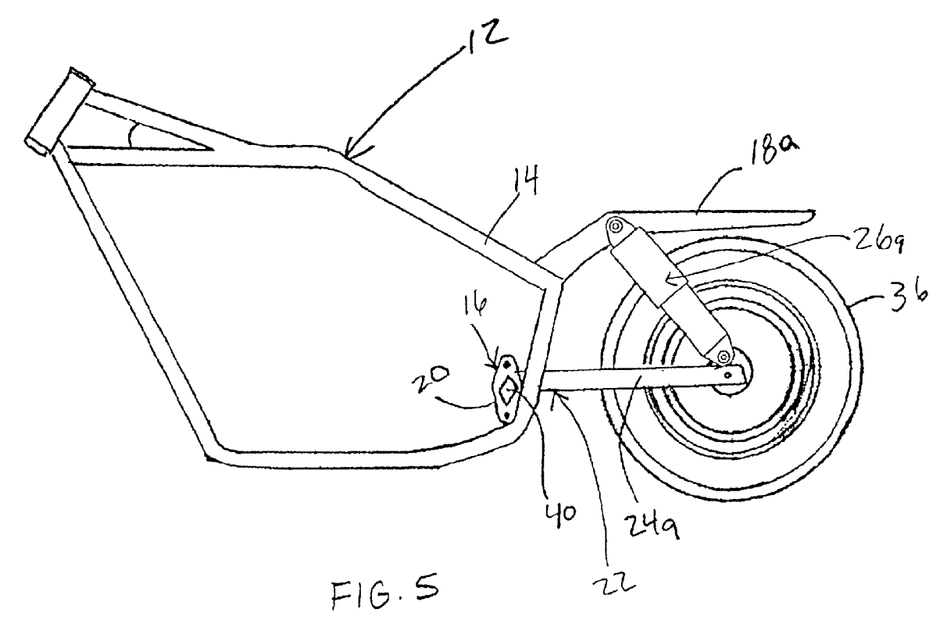
FIG. 5 illustrates a side view of a motorcycle chassis where the air-bag suspension system is fully extended.

FIG. 5 illustrates a side view of a motorcycle chassis 12 where the air-bag suspension system 10 is fully extended. For purposes of brevity and clarity, the only component of the air-bag suspension system 10 illustrated is shock absorber assembly 26a, and it is to be understood that all components of the air-bag suspension system 10 are required to properly function. A wheel 36 is shown to illustrate the space between wheel 36 and fender strut 18a and the position of arm 24a of swing arm 22 when the shock absorber assembly 26a is fully extended.

FIG. 6 illustrates a side view of a motorcycle chassis 12 where the air-bag suspension system 10 is completely compressed. For purposes of brevity and clarity, the only component of the air-bag suspension system 10 illustrated is shock absorber assembly 26a, and it is to be understood that all components of the air-bag suspension system 10 are required to properly function. Illustrated in particular is the position of wheel 36 and the pivotal movement of swing arm 22 about the pivot axis 40 of the swing arm pivot assembly 20 when shock absorber assembly 26a is completely compressed. The position of swing arm assembly 22 when the shock absorber assembly 26a is fully extended (FIGS. 2 and 5) is illustrated in dashed lines 38 to show the range of movement the air-bag suspension system 10 allows.

FIG. 7 is a schematic of the air source and distribution system 84 of the air-bag suspension system 10. The air source and distribution system 84 is comprised of a compressor 28, a plurality of air hoses 58a–58n, a solenoid valve 32, a check valve 34, three Y-connectors 86, 88 and 90, an optional pressure gauge 92, and the shock absorber assemblies 26a and 26b.

When the rider would like the air-bag suspension system 10 to expand, air is generated in compressor 28 and flows through air hose 58a into check valve 34, continues through air hose 58b into Y-connector 86, on through air hose 58d into the optional Y-connector 88, into air hose 58f and into Y-connector 90, which equally distributes the air to air hose 58g and 58n, and finally into shock absorbers 26b and 26a, respectively, causing the rear end of the motorcycle to rise.

When the rider would like the air-bag suspension system 10 to compress, air is released from shock absorbers 26b and 26a and flows through air hoses 58g and 58n, through Y-connector 90, through air hose 58f into optional Y-connector 88, through air hose 58d into Y-connector 86, on through air hose 58c, and is released through solenoid valve 32, causing the rear end of the motorcycle to lower. Once the air flows through Y-connector 86, it flows through both air hoses 58b and 58c, but the air in air hose 58b is stopped by check valve 34, causing the air to flow through Y-connector 86, air hose 58c and out through solenoid valve 32.

When the air-bag suspension system 10 is in use, a constant pressure is maintained within the air-bag suspension system 10, which allows for the use of an optional pressure gauge 92 which is fed air through air hose 58e at Y-connector 88. The constant pressure allows the rider to monitor the exact pressure in the system at all times. The air-bag suspension system 10 does not require the pressure gauge 92, which can be omitted if air hose 58d is directly connected to Y-connector 90. The power and control of the air source and distribution system 84 will be described in detail with reference to FIG. 8.

Figure 8:
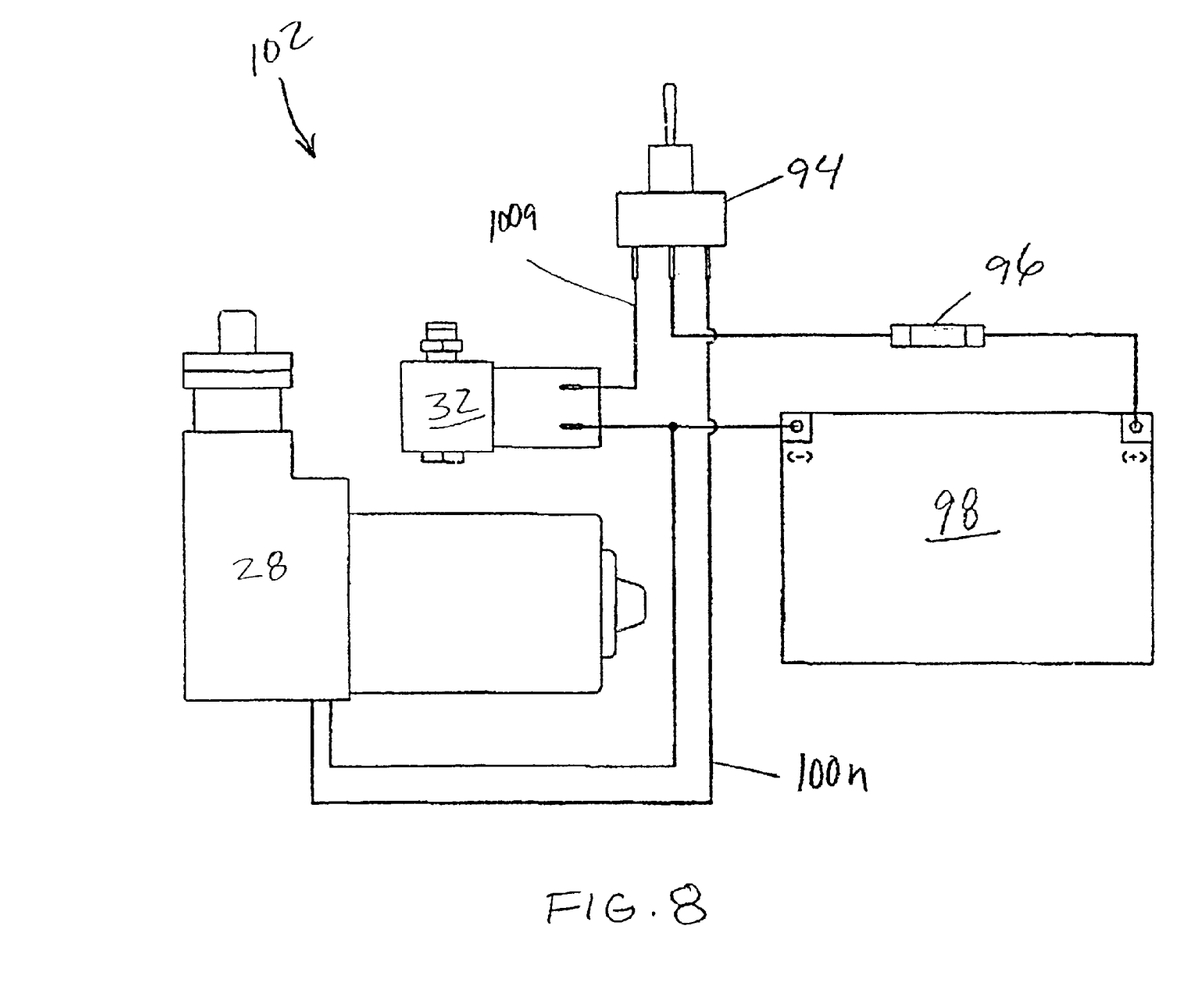
FIG. 8 is an electrical schematic diagram of the air-bag suspension system; and, FIG. 9 is a graph comparing the air-bag suspension system to a stock coil spring hydraulic suspension system and illustrates the range of adjustment allowed by the air-bag suspension system and the stock coil spring hydraulic suspension system.

FIG. 8 is an electrical schematic diagram of the air-bag suspension system 10. The electrical system 102 of the air-bag suspension system 10 is comprised of a compressor 28, a solenoid valve 32, a switch 94, a fuse 96, a battery 98 and a plurality of wires 100a–100n interconnecting the electrical system, as shown.

The switch 94 engages compressor 28 in one position, causing expansion of the air-bag suspension system 10, and in the opposite position, switch 94 engages solenoid valve 32, releasing air and causing compression of the air-bag suspension system 10. When switch 94 is left in a neutral position, constant pressure is maintained throughout the air-bag suspension system 10, until switch 94 is activated.

Figure 9:
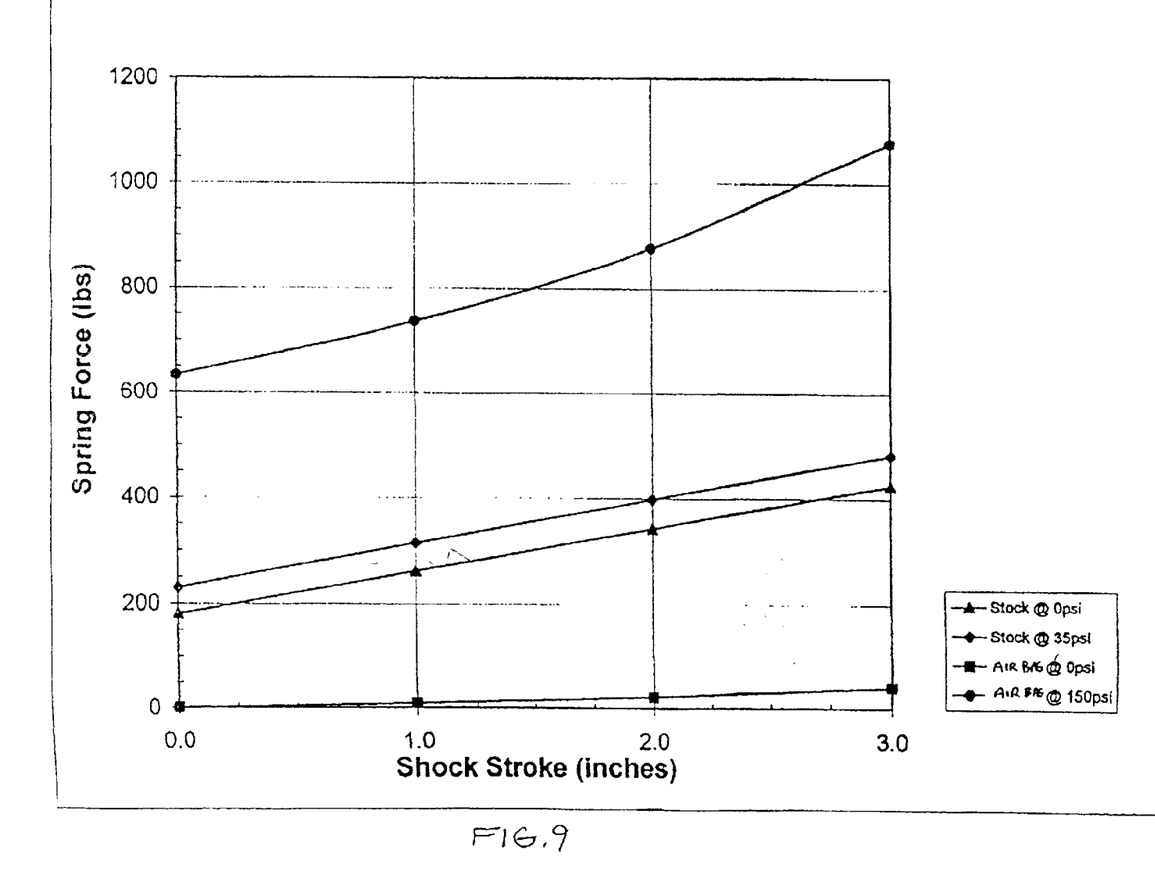

FIG. 9 is a graph comparing the air-bag suspension system 10 to a stock coil spring hydraulic suspension system and illustrates the range of adjustment allowed by the air-bag suspension system 10 and the stock coil spring hydraulic suspension system. The area between the triangle line (▲) and the diamond line (♦) is the range of adjustment of a standard coil spring hydraulic suspension system, and the area between the square line (■) and the circle line (●) is the range of adjustment of the air-bag 10 suspension system 10. It is apparent that the air-bag suspension system 10 allows the user a greater range of adjustment (0–150 psi) than that of the stock suspension system (0–35 psi) and a greater wheel travel.

MODE OF OPERATION

With reference to FIGS. 1–8, the mode of operation is now described, where all numerals correspond to those elements previously described. When the air-bag suspension system 10 and Switch 94 are in a neutral position (mid-stroke) as described and illustrated in FIG. 3, the rider may adjust the rear ride height and suspension stiffness by adding air into or releasing air from the air-bag suspension system 10.

In order to raise the rear end of the motorcycle, switch 94 is engaged in an upward position and thereby actuates compressor 28 which generates air and introduces it into the shock absorber assemblies 26a and 26b via a plurality of air hoses 58a–58n and Y-connectors 86, 88 and 90, as described and illustrated in FIG. 7. It is to be understood that air is also introduced into the optional gauge 92, if utilized, and allows the rider to monitor the amount of air in the air-bag suspension system 10. Once air is introduced into the air-bags 44 of the shock absorber assemblies 26a and 26b, the rear end of the motorcycle will rise and accommodate a heavier load, provide more ground clearance, and prevent bottoming-out over rough terrain.

In order to lower the rear end of the motorcycle, switch 94 is engaged in a downward position and thereby actuates solenoid valve 32 which releases air from the shock absorber assemblies 26a and 26b via the plurality of air hoses 58a–58n and Y-connectors 86, 88 and 90, as described and illustrated in FIG. 7. It is to be understood that air is also released from the optional gauge 92, if utilized, and allows the rider to monitor the amount of air in the air-bag suspension system 10. Once air is released from the air-bags 44 of the air-bag suspension system 10, the rear end of the motorcycle will lower and provide a custom appearance. An additional benefit of the air-bag suspension system 10 allows the motorcycle to lower to the point where the main frame 14 makes intimate contact with the ground, when all air is released from the air-bags 44, eliminating the need for a kick stand, if so desired.

It is to be understood that rear wheel travel of the air-bag suspension system 10 allows the rider to adjust 10 ride height and suspension stiffness\softness by adjusting the amount of air in the air-bag suspension system 10 between 0–150 psi, as illustrated in FIG. 9, creating a range of adjustment not currently available.

Various modifications can be made to the present invention without departing from the apparent scope hereof.

What is claimed is:

1. An air-bag suspension system for a motorcycle comprising:
   a. a main frame;
   b. a pair of fender struts mounted to the main frame in a parallel fashion;
   c. a swing arm pivotally mounted to the motorcycle main frame about a pivot axis, the swing arm including a pair of arms, each arm of the pair of arms including a mounting bracket;
   d. an on-board compressor;
   e. a solenoid valve;
   f. a pair of shock absorber assemblies, each of the shock absorber assemblies of the pair of shock absorber assemblies having an internal air-bag, an upper end mounted to one of the pair of fender struts by a fender strut mount, and a lower end pivotally mounted to the mounting bracket of one of the arms of the pair of arms of the swing arm;
   g. an air distribution system including a plurality of air hoses and Y-connectors, the air distribution system interconnecting the internal air-bag of each of the shock absorber assemblies of the pair of shock absorber assemblies;
   h. the air distribution system equally distributing air between the internal air-bags of the pair of shock absorber assemblies; and,
   i. the on-board compressor of the air distribution system wired to be electrically activated by a switch and the solenoid valve wired to be electrically activated by the switch and the switch being a three position switch with a first position electrically activating the on-board compressor and a second position electrically activating the solenoid valve.

2. The air-bag suspension system of claim 1, wherein the air distribution system further includes a check valve.

3. The air-bag suspension system of claim 2, wherein air generated in the on-board compressor flows to the check valve and continues through air hoses to a Y-connector for equal distribution between the internal air-bags of the pair of shock absorber assemblies such that the frame is raised relative to the swing arm.

4. The air-bag suspension system of claim 3, wherein air equally distributed between the internal air-bags of the pair of shock absorber assemblies may be selectively released by the solenoid valve such that the frame is lowered relative to the swing arm.

5. The air-bag suspension system of claim 1, wherein the air distribution system further includes an air pressure gauge for monitoring pressure equally distributed between the internal air-bags of the pair of shock absorber assemblies.

6. The air-bag suspension system of claim 1, wherein the on-board compressor is an electrically driven on-board compressor.

7. The air-bag suspension system of claim 6, wherein the on-board compressor of the air distribution system is wired to be electrically activated by a switch.

8. The air-bag suspension system of claim 1, wherein the solenoid valve is wired to be electrically activated by a switch.

9. The air-bag suspension system of claim 1, wherein a third position of the switch activates neither the on-board compressor nor the solenoid valve.

10. The air-bag suspension system of claim 1, wherein a third position separates the first position and the second position.

11. The air-bag suspension system of claim 1, wherein the switch has a fused electrical connection to a battery.

12. An air-bag suspension system for a motorcycle having a main frame, a pair of fender struts mounted to the main frame in a parallel fashion, and a swing arm pivotally mounted to the motorcycle main frame about a pivot axis, the swing arm including a pair of arms, each arm of the pair of arms including a mounting bracket, the air-bag suspension comprising:
   a. an on-board compressor;
   b. a solenoid valve;
   c. a pair of shock absorber assemblies, each of the shock absorber assemblies of the pair of shock absorber assemblies having an internal air-bag, an upper end mounted to one of the fender struts of the pair of fender struts by a fender strut mount, and a lower end pivotally mounted to the mounting bracket of one of the arms of the pair of arms of the swing arm;
   d. an air distribution system including a plurality of air hoses and Y-connectors, the air distribution system interconnecting the internal air-bag of each of the shock absorber assemblies of the pair of shock absorber assemblies to the solenoid valve and to the on-board compressor;
   e. the air distribution system equally distributing air between the internal air-bags of the pair of shock absorber assemblies; and,
   f. the on-board compressor of the air distribution system wired to be electrically activated by a switch and the solenoid valve wired to be electrically activated by the switch and the switch being a three position switch with a first position electrically activating the on-board compressor and a second position electrically activating the solenoid valve.

13. The air-bag suspension system of claim 12, wherein the air distribution system further includes a check valve.

14. The air-bag suspension system of claim 13, wherein air generated in the on-board compressor flows to the check valve and continues through air hoses to a Y-connector for equal distribution between the internal air-bags of the pair of shock absorber assemblies such that the frame is raised relative to the swing arm.

15. The air-bag suspension system of claim 14, wherein air equally distributed between the internal air-bags of the pair of shock absorber assemblies may be selectively released by the solenoid valve such that the frame is lowered relative to the swing arm.

16. The air-bag suspension system of claim 12, wherein the air distribution system further includes an air pressure gauge for monitoring pressure equally distributed between the internal air-bags of the pair of shock absorber assemblies.

17. The air-bag suspension system of claim 12, wherein the on-board compressor is an electrically driven on-board compressor.

18. The air-bag suspension system of claim 17, wherein the on-board compressor of the air distribution system is wired to be electrically activated by a switch.

19. The air-bag suspension system of claim 12, wherein the solenoid valve is wired to be electrically activated by a switch.

20. The air-bag suspension system of claim 12, wherein a third position of the switch activates neither the on-board compressor nor the solenoid valve.

21. The air-bag suspension system of claim 12, wherein a third position separates the first position and the second position.

22. The air-bag suspension system of claim 12, wherein the switch has a fused electrical connection to a battery.

* * * * *